United States Patent
Zhao

(10) Patent No.: US 8,947,745 B2
(45) Date of Patent: Feb. 3, 2015

(54) APPARATUS AND METHOD FOR SCANNING AND DECODING INFORMATION IN AN IDENTIFIED LOCATION IN A DOCUMENT

(71) Applicant: Motorola Solutions, Inc, Schaumburg, IL (US)

(72) Inventor: Ming-Xi Zhao, Shanghai (CN)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/934,272

(22) Filed: Jul. 3, 2013

(65) Prior Publication Data

US 2015/0009542 A1 Jan. 8, 2015

(51) Int. Cl.
*H04N 1/04* (2006.01)
*H04N 1/00* (2006.01)
*G06K 9/00* (2006.01)

(52) U.S. Cl.
CPC ........ *H04N 1/00331* (2013.01); *G06K 9/00469* (2013.01)
USPC ............ 358/406; 358/504; 382/321; 382/176

(58) Field of Classification Search
CPC ....... G06K 2209/01; G06K 9/34; G06K 9/72; G06K 9/00463; G06K 9/723; G06K 9/2054; G06K 9/26; G06K 9/78; G06K 9/03; G06K 9/64; G06K 9/00872; G06F 3/04883; G06F 3/0233
USPC ........... 358/1.9, 2.1, 500, 400, 405–406, 504, 358/462; 382/321, 176–182, 185–187, 310, 382/226–229
See application file for complete search history.

(56) References Cited

U.S. PATENT DOCUMENTS

| | | | |
|---|---|---|---|
| 5,805,747 A | 9/1998 | Bradford | |
| 5,999,647 A * | 12/1999 | Nakao et al. | 382/187 |
| 6,151,423 A * | 11/2000 | Melen | 382/289 |
| 6,941,323 B1 | 9/2005 | Galperin | |
| 7,734,092 B2 | 6/2010 | Curtis et al. | |
| 8,249,364 B2 | 8/2012 | Fosseide et al. | |
| 8,290,273 B2 | 10/2012 | Prasad et al. | |
| 8,570,614 B2 * | 10/2013 | Carpenter | 358/474 |
| 2008/0002914 A1 | 1/2008 | Vincent et al. | |
| 2011/0255782 A1 | 10/2011 | Welling et al. | |

* cited by examiner

*Primary Examiner* — Thomas D Lee
*Assistant Examiner* — Stephen M Brinich

(57) ABSTRACT

A imaging scanner identifies first and second locations in a first and second captured image of a document, analyzes each character in the identified locations, and produces a first and second string, each including a character and a confidence value. The device determines that a first measurement of the confidence values in each of the first and second string is beyond a range of a first threshold. The device compares the confidence value for each character in the first string with a corresponding confidence value in the second string, selects a character from one of the first or second string with a higher confidence value; and produces a combined string including the selected characters and the confidence value associated with each selected character.

20 Claims, 6 Drawing Sheets

310 — VNUSACHEN<<SHIJIE<<<<<<<<<<<<<<<<<<<<<<<<<
GS04338287CHN7911015M1209187B3SHG0PA09252059

312 — VNUSACHEN<<SHIJIE<<<<<<<<<<<<<<<<<<<<<<<<<
G504338287CHN1911015M1209187B3SHG0PA09252059

318 — VNUSACHEN<<SHIJIE<<<<<<<<<<<<<<<<<<<<<<<<<
G504338287CHN7911015M1209187B3SHG0PA09252059

APPARATUS AND METHOD FOR SCANNING AND DECODING INFORMATION IN AN IDENTIFIED LOCATION IN A DOCUMENT

BACKGROUND OF THE INVENTION

Users in various fields, for instance, users in the public or private sectors rely on a varied set of documents for daily functions. A single document such as a driver's license, a passport, a bill of lading form, or a shipping receipt may include various kinds of information. For example, a passport information page may include a photo section; a text section with a name and features, such as height, weight, and hair color; a graphics section with the driver's signature; one or more bar codes; and a machine readable zone. Information may be obtained from these documents with a scanning device which may be configured to read radio frequency identifier (RFID) tags and barcodes and/or retrieve an image of a document.

Subsequent to capturing information from the document, the format of certain types of information, for example, the format of barcodes, enable them to be easily and quickly identified and decoded. An Optical Character Recognition (OCR) engine may be used to convert a scanned image of the document into alphanumeric characters that can be further analyzed. However, the quality of the scanned image may affect the decoding rate associated with decoding the alphanumeric characters in the scanned image. For instance, a complex background on a scanned image of a passport information page may make it difficult for the OCR engine to decode text in, for example, a Machine Readable Zone (MRZ) on the passport information page. Therefore, the scanning device may not be about to decode text in one section of the document as efficiently as it could decode a barcode in another section of the same document.

A current scanning device uses multiple OCR engines to decode information retrieved from one input image. Each OCR engine in the scanning device outputs decoded information where the accuracy of the texts in each output is determined by corresponding confidence values. In order to select the output with the most accurate text, the outputs from the OCR engines in the scanning device are prioritized. Another scanning device uses multiple binarization methods, each of which produces a binary image that is generated from a single input image. The binary images are used to generate OCR results, where each OCR result is associated with a set of corresponding confidence values that are used to select the most accurate OCR result. The quality of the image inputted into the scanning device with multiple OCR engines and the scanning device using multiple binarization methods may affect the decoding rate and process such that each of these scanning devices may not be able to decode information in one section of the input image, for example, alphanumeric characters in one section of the input image, as efficiently as it could decode information, such as barcodes, in other sections of the input image.

Accordingly, there is a need for an improved method and apparatus for scanning and decoding information in an identified location in the document.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4A, FIG. 4B, and FIG. 4C show the output from two sequentially captured images of a single document in accordance with some embodiments.

Figure 1:
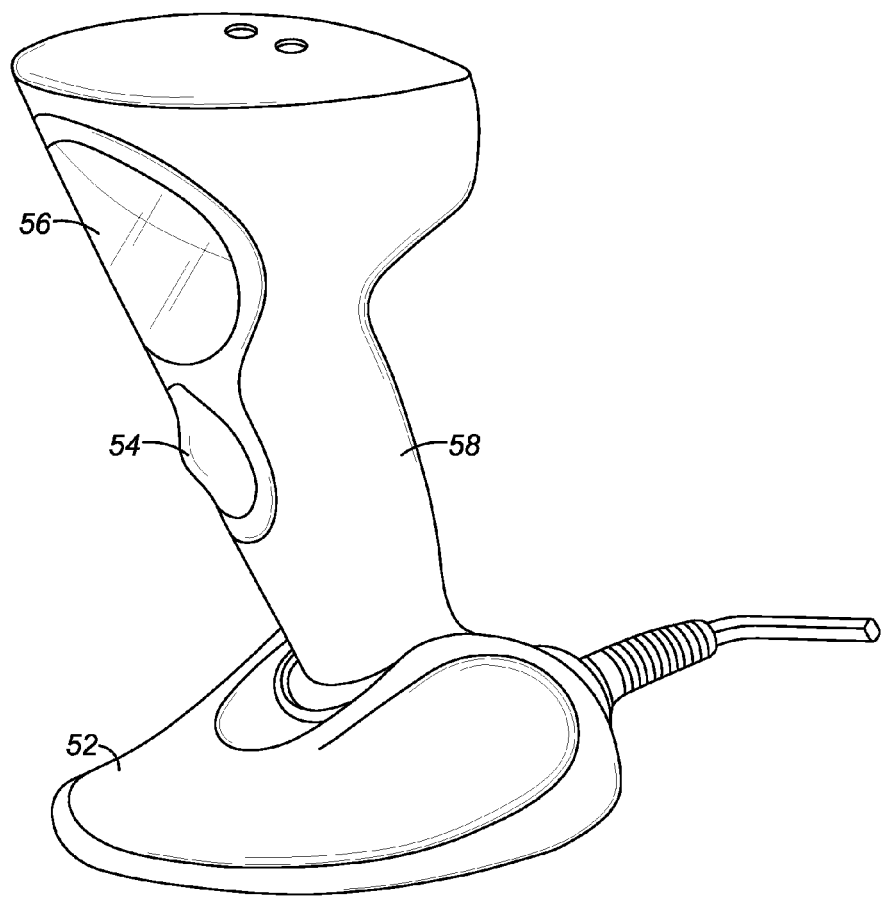
FIG. 1 is a diagram of a scanning device configured to sequentially scan two or more images of a document and process information from a desired location in the scanned images in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses including a scanning device configured to sequentially capture two or more images of a single document. The scanning device identifies a first location in a first captured image where information to be decoded is located, analyzes each character in the first location, and produces a first string including a corresponding character and a confidence value for each character in the first location. The scanning device then determines that a first measurement of the confidence values in the first string is beyond a range associated with a first confidence threshold and determines that a second measurement of the confidence values in the first string is beyond a range associated with a second confidence threshold. The scanning device identifies a second location in a second captured image where information to be decoded is located, analyzes each character in the second location, produces a second string including a corresponding character and a confidence value for each character in the second location, determines that a first measurement of the confidence values in the second string is beyond the range associated with the first confidence threshold, and determines that a second measurement of the confidence values in the second string is beyond the range associated with the second confidence threshold. The scanning device compares the confidence value for each character in the first string with a corresponding confidence value in the second string, selects a character from one of the first string or the second string with a higher confidence value; and outputs a combined string including the selected characters and the confidence value associated with each selected character.

FIG. 1 is a diagram of a scanning device (also referred to herein as an imaging scanner) configured to sequentially scan two or more images of a document and process information from a desired location in the scanned images in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product or a document, and a trigger 54 can be manually depressed to initiate imaging of the barcode or document. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
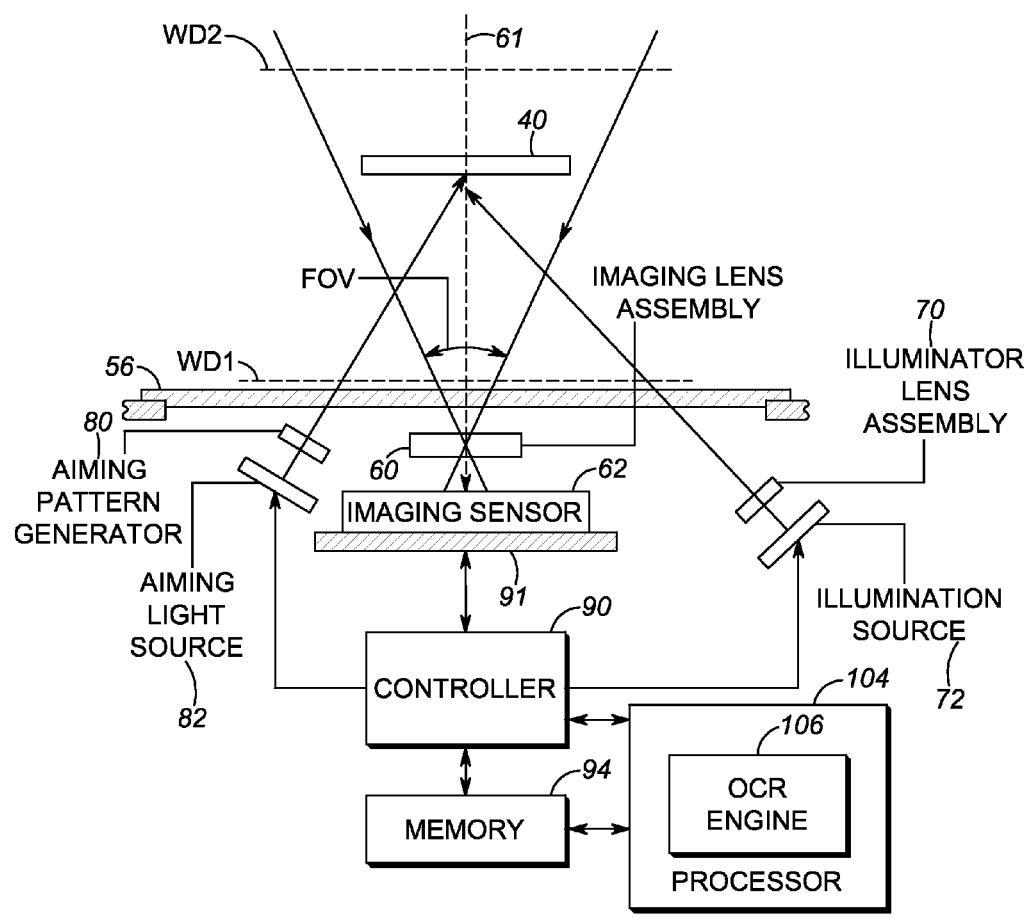
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a charged coupled devices (CCD) or a complementary metal oxide semiconductor (CMOS) imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a document 40 as pixel data over a two-dimensional imaging field of view (FOV).

The document 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the document 40 and the imaging lens arrangement 60. Some of the imaging scanners can include an auto-focus system to enable a document be more clearly imaged with the imaging sensor 62 based on the measured distance of this document. In some implementations of the auto-focus system, the focus length of the imaging lens arrangement 60 is adjusted based on the measured distance of the document. In some other implementations of the auto-focus system, the distance between the imaging lens arrangement 60 and the imaging sensor 62 is adjusted based on the measured distance of the document.

In FIG. 2, the illuminating lens arrangement 70 and the illumination source 72 are designed to operate together for generating an illuminating light towards the document 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the document 40. Such aiming pattern can be used by the operator to accurately aim the imaging scanner at the document. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more documents that are within the imaging field of view (FOV) of the imaging scanner 50. In some implementations, the documents 40 can be decoded by digitally processing a captured image of the document with a microprocessor.

In operation, in accordance with some embodiments, the controller 90 sends a command signal to energize the illumination source 72 for a predetermined illumination time period. The controller 90 then exposes the imaging sensor 62 to capture an image of the document 40. The captured image of the document 40 is transferred to the controller 90 as pixel data. Such pixel data is digitally processed by the decoder in the controller 90 to decode the document. The information obtained from decoding the document 40 is then stored in the memory 94 or sent to a processor 104 with an Optical Character Recognition (OCR) engine 106 for further processing.

The processor 104 is configured to identify a desired section in an image captured by the imaging scanner 50. The OCR engine 106 is configured to analyze each character in the desired section and to output a character string including a corresponding character and a confidence value for each character in the desired section. The processor 104 is also configured to determine if the character string outputted by the OCR engine 106 is within a range of one or more predefined thresholds and to output a finalized string that represents each character in the desired section. The finalized string may be further processed by user applications. In some embodiments, the functions of the processor 104 and the OCR engine 106 may be implemented in the controller 90. The imaging scanner 50 may be also included in, for example, a mobile phone, a smart phone, a tablet, a personal digital assistant, a point of sale device, or other handheld computing device capable of scanning and decoding an image of a document.

In order to decode information in a desired section of the sequentially scanned images, the processor 104 is configured to identify a local area, in a first sequentially scanned image of the document, where the information is located. For example, on a travel document, data is encoded in a Machine Readable Zone (MRZ) for faster processing. The MRZ is typically two or three lines of text located at the bottom of the travel document. The MRZ may also include background textures. In order to speed up the time for finding the location of the MRZ, the processor 104 is configured identify the MRZ feature in the first scanned image of two or more sequentially scanned images. The processor 104 may identify the desired section in the first image by using predefined attributes associated with the information in the desired section. For example, the processor 104 may use the location (i.e., the bottom of the travel document), the font size and the number of lines in the MRZ to identify the location on the travel document with the MRZ. The location of the desired section (for example, the location of the MRZ) in the subsequent scanned images will be similar to the location identified in the first image.

Subsequent to identifying the desired location (in our example, the section with the MRZ) in the first scanned image, the OCR engine 106 is configured to analyze each character in the desired location in the first image. The OCR engine 106 outputs a first character string that includes a corresponding character for each character in the desired location of first image. The first character string may also include confidence values, each of which is associated with a character in the first character string. In some embodiments, the OCR engine 106 may output a separate first confidence string with the confidence values associated with characters in the first character string. Each confidence value is a value within in a range, with the lower end of the range indicating a lower level of certainty with respect to the accuracy of the associated character in the first character string and the higher end of the range indicating a higher level of certainty with respect to the accuracy of the associated character in the first character string. For example, the confidence value for each character in the first character string may be a value between 0 and 9, where 0 represents the lowest confidence value regarding the accuracy of an associated character in the first character string and 9 represents the highest confidence value regarding the accuracy of an associated character in the first character string.

The processor 104 determines if the first character string is within a range associated with a first confidence threshold, and if it is, the processor 104 outputs the first character string and ends the decoding process. The first confidence threshold may be a value associated with a percentage of the confidence values associated with the first character string with a higher certainty of accuracy. For example, if the processor 104 determines that 99.9 percent of the characters in the first character string have a confidence value of "9" and if the first confidence threshold is set at 99.5 percent and above, the processor 104 can determine that the first character string is within the range of the first confidence threshold and end the decoding process. However, if the processor 104 determines that the characters in the first character string have confidence values beyond the range associated with the first confidence threshold (for example, below the 99.5 percent threshold), the processor 104 then determines if the first character string is within the range of a second confidence threshold. The second confidence threshold may be a value associated with the percentage of un-matched characters in the first character string, i.e., the percentage of the confidence values in the first confidence string with a lower certainty of accuracy. A character in the first character string may be considered to be un-matched, if the associated confidence value is below a predefined value, for example, 5. If the processor 104 determines that the first character string is within the range of the second confidence threshold the processor may terminate the character decoding process. For example, if the second predefined confidence threshold is set at 3 percent and the processor 104 determines that 3.5 percent of the characters in the first character string are unrecognizable (for example, because the associated confidence value associated with 3.5 percent of the characters is less than 5), the processor 104 may terminate the character decoding process. On the other hand, if the processor 104 determines that 2 percent of the characters in the first character string are unrecognizable, the processor 104 may continue with the decoding process.

Subsequent to determining that the first character string is beyond the range of a second confidence threshold, the processor 104 is configured to expand, by a predefined amount, the area identified in the first scanned image to identify the desired location in the second sequentially scanned image. Subsequent to identifying the desired section (for example, the MRZ section) in the second scanned image, the OCR engine 106 is configured to analyze each character in the desired section in the second scanned image. The OCR engine 106 outputs a second character string including a corresponding character and an associated confidence value for each character in the desired location.

If the processor 104 determines that the second character string is within the range associated with the first confidence threshold, the processor 104 outputs the second character string and ends the decoding process. For example, if the processor 104 determines that 99.6 percent of the characters in the second character string have a confidence value of 9 and if the first confidence threshold is set at 99.5 percent and above, the processor 104 can determine that the second character string is within the range associated with the first confidence threshold and end the decoding process.

However, if the processor 104 determines that the second character string is beyond (for example, below) the range associated with the first confidence threshold, the processor 104 then determines if the second character string is within the range of the second confidence threshold. If the processor 104 determines that the second character string is within the range of the second confidence threshold the processor may terminate the character decoding process. On the other hand, subsequent to determining that the second character string is beyond the range of the second confidence threshold, the processor 104 compares the confidence value for each character in the first character string with the corresponding confidence value for the character in the second character string. The processor 104 selects the character with a higher confidence value from the first or second character strings and produces a finalized character string with the selected characters and an associated confidence value. The processor 104 may determine that the finalized character string is acceptable if the confidence values associated with the characters in the finalized character string is within a range associated with (for example, above) the first confidence threshold. If, however, the processor 104 determines that the finalized character string is unacceptable (for example, beyond the range associated with (for example, below) the first confidence threshold), the processor 104 may retrieve a third sequentially captured image and process the third image against the finalized character string.

Figure 3A:
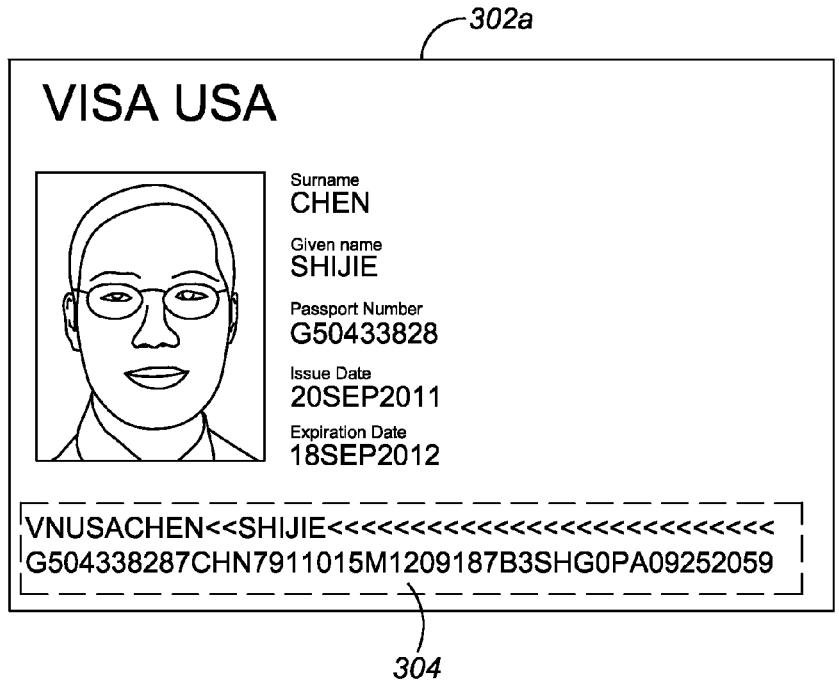
FIG. 3A and FIG. 3B depict two sequentially captured images of a single document in accordance with some embodiments.
Figure 3B:
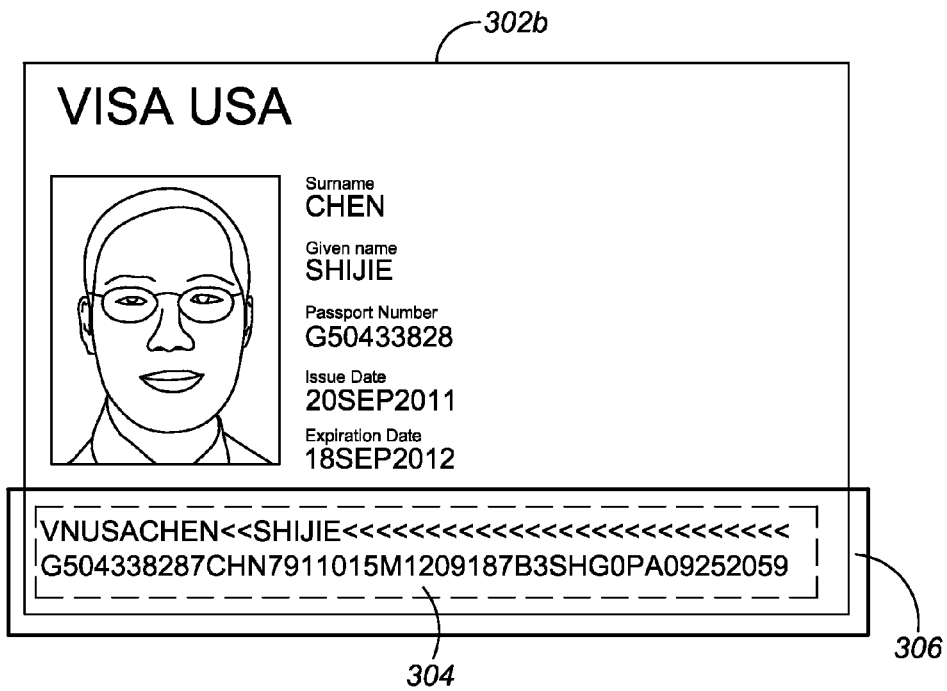

FIG. 3 depicts two sequentially captured images of a single document in accordance with some embodiments. Input images 302 (i.e., image 302a and image 302b) are sequentially captured by scanning device 50 such that there is a slight difference with respect to lighting and position in images 302a and 302b. In order to decode text in the MRZ in scanned images 302a and 302b, the processor 104 identifies the MRZ feature in image 302 as shown by block 304. The processor 104 may use the location (i.e., the bottom of the travel document), the font size and the number of lines in the MRZ to identify section 304 in image 302a. The processor 104 expands, by a predefined amount, section 304 to determine the location of the MRZ in image 302b, as shown by block 306.

FIG. 4 shows the output from two sequentially captured images of a single document in accordance with some embodiments. Continuing with the images shown in FIG. 3, the OCR engine 106 analyzes each character within block 304 of image 302a and within block 306 of image 302b. The OCR engine 106 outputs a first character string 310 for the analyzed characters from block 304 and a second character string 312 for the analyzed characters from block 306. The OCR engine 106 also outputs a confidence string 314 with a confidence value for each character in the first character string 310 and a confidence string 316 with a confidence value for each character in the second character string 312. In some embodiments, character string 310 and confidence string 314 may be a single output string and character string 312 and confidence string 316 may be a single output string. Each confidence value in confidence strings 314 and 316 is associated with a character in the first character string 310 or the second character string 312 and each confidence value is a value between 0 and 9, where 0 represents the lowest confidence value with respect to the accuracy of the associated character and 9 represents the highest confidence value with respect to the accuracy of the associated character in the first character string 310 and the second character string 312. Therefore, the second confidence value in the confidence string 314 indicates that there is a low certainty of the accuracy of the second character, shown as "S", in the second line in the first character string 310; and the fourteenth confidence value in the confidence string 316 indicates that there is medium certainty of the accuracy of the fourteenth character, shown as "1", in the second line in the second character string 312.

The processor 104 determines that the confidence values in each of the confidence strings 314 and 316 are beyond the range associated with a first confidence threshold. The processor 104 also determines that the confidence values in each of the confidence strings 314 and 316 are beyond the range of a second confidence threshold. The processor 104 compares the confidence value for each character in the character strings 310 and 312, selects the character with a higher confidence value from the character strings 310 and 312, and produces a finalized character string 318. The finalized character string 318 includes the selected characters. The processor 104 also produces a confidence string 320 that is associated with the finalized character string 318. Accordingly, the finalized character string 318 excludes the second character "S" from the second line of character string 310 and fourteenth character "1" from second line of character string 312.

Figure 5A:
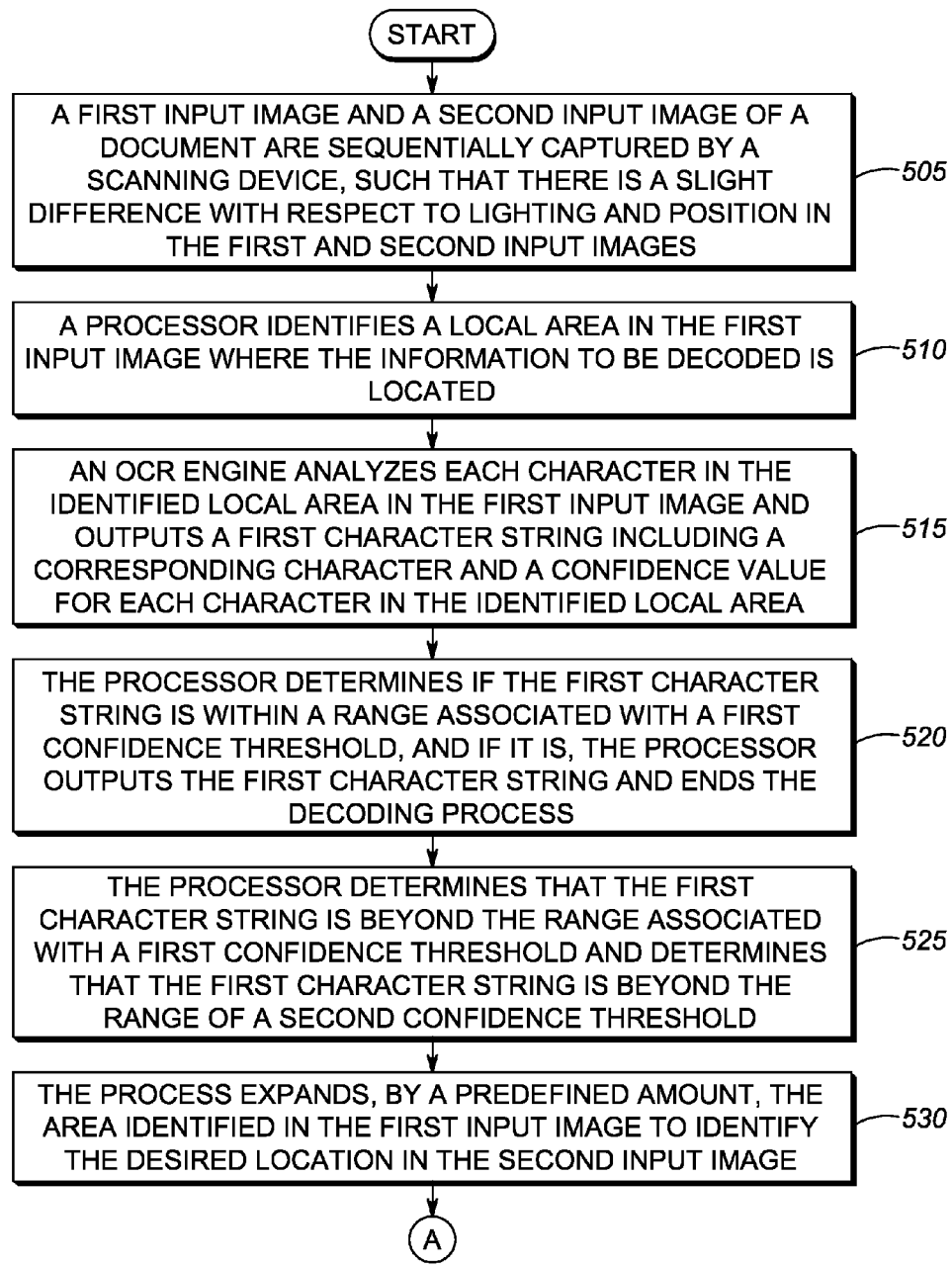
FIG. 5A and FIG. 5B show a flow diagram of steps used in accordance with some embodiments.
Figure 5B:
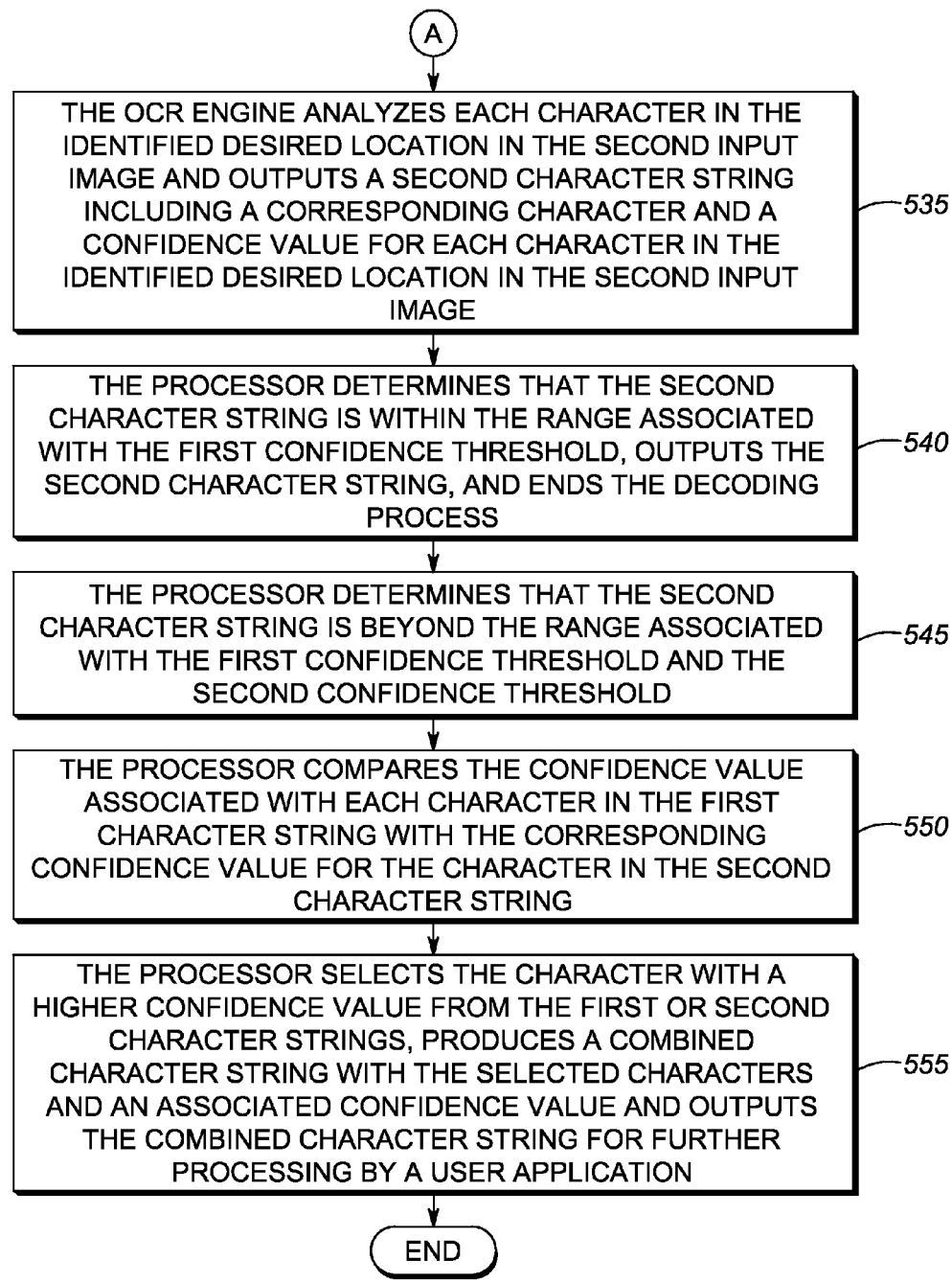

FIG. 5 is a flow diagram of steps used in accordance with some embodiments. At 505, a first input image and a second input image of a document are sequentially captured by a scanning device, such that there is a slight difference with respect to lighting and position in the first and second input images. At 510, a processor identifies a local area in the first input image where the information to be decoded is located. At 515, an OCR engine analyzes each character in the identified local area in the first input image and outputs a first character string including a corresponding character and a confidence value for each character in the identified local area. At 520, the processor determines if the first character string is within a range associated with a first confidence threshold, and if it is, the processor outputs the first character string and ends the decoding process. At 525, the processor determines that a first character string is beyond the range associated with the first confidence threshold and determines that the first character string is beyond the range of a second confidence threshold. The first confidence threshold may be a percentage of the confidence values associated with the first character string with a higher certainty of accuracy and the second confidence threshold may be a percentage of the confidence values associated with the first character string with a lower certainty of accuracy. At 530, the process expands, by a predefined amount, the area identified in the first input image to identify the desired location in the second input image.

At 535, the OCR engine analyzes each character in the identified desired location in the second input image and outputs a second character string including a corresponding character and a confidence value for each character in the identified desired location in the second input image. At 540, the processor determines that the second character string is within the range associated with the first confidence threshold, outputs the second character string, and ends the decoding process. At 545, the processor determines that the second character string is beyond the range associated with the first confidence threshold and the second confidence threshold. At 550, the processor compares the confidence value associated with each character in the first character string with the corresponding confidence value for the character in the second character string. At 555, the processor selects the character with a higher confidence value from the first or second character strings, produces a combined character string with the selected characters and an associated confidence value and outputs the combined character string for further processing by a user application.

It should be noted that although the above description describes how two sequentially captured images are process, the above description may be applied to more than two sequentially captured images. For example, a third sequentially captured image may be processed with the finalized string from the first and second sequentially captured images and a fourth sequentially captured image may be processed with the finalized string from the first, second, and third sequentially captured images, and so on.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    sequentially, in an imaging scanner, capturing two or more images of a single document;
    identifying, in the imaging scanner, a first location in a first captured image where information to be decoded is located, analyzing each character in the first location, and producing a first string including both a corresponding character and a first confidence value for each character in the first location;
    determining, in the imaging scanner, that a first measurement of the confidence values in the first string is beyond a range associated with a first confidence threshold and;
    identifying, in the imaging scanner, a second location in a second captured image where information to be decoded is located, analyzing each character in the second location, and producing a second string including both a corresponding character and a second confidence value for each character in the second location;
    comparing, in the imaging scanner, the first confidence value for each character in an identified location in the first string with the second confidence value for the character in the same identified location in the second string;
    selecting, in the imaging scanner, a character from one of the first string or the second string with a higher confidence value; and
    producing and outputting, by the imaging scanner, a combined string including the selected characters.

2. The method of claim 1, further comprising:
    in response to determining that the first measurement of the confidence values in the second string is beyond the range associated with the first confidence threshold, determining that a second measurement of the confidence values in the second string is beyond the range associated with the second confidence threshold; and
    wherein said identifying a second location in a second captured image where information to be decoded is located comprises identifying the second location in the second captured image after determining that the second measurement of the confidence values in the first string is beyond the range associated with the second confidence threshold.

3. The method of claim 1, wherein the first confidence value is within in a range, with a lower end of the range indicating a lower level of certainty with respect to the accuracy of a corresponding character in an associated string and a higher end of the range indicating a higher level of certainty with respect to the accuracy of the corresponding character in the associated string.

4. The method of claim 1, further comprising determining that the first measurement of the confidence values in the first string is within the range associated with the first confidence threshold, outputting the first string, and ending a decoding process.

5. The method of claim 2, responsive to determining that the second measurement of the confidence values in the first string is within the range associated with the second confidence threshold, ending a decoding process.

6. The method of claim 1, wherein the identifying the second location comprises expanding, by a predefined amount, the first location to identify the second location.

7. The method of claim 1, further comprising determining that a first measurement of the confidence values in the combined string is within the range associated with the first confidence threshold, outputting the combined string and ending a decoding process.

8. The method of claim 1, further comprising determining that a first measurement of the confidence values in the combined string is beyond the range associated with the first confidence threshold, identifying a third location in a third captured image where information to be decoded is located, analyzing each character in the third location, and producing a third string including a corresponding character and a confidence value for each character in the third location.

9. The method of claim 8, further comprising determining that a first measurement of the confidence values in the third string is beyond the range associated with the first confidence threshold, and responsive to determining that the first measurement of the confidence values in the third string is beyond the range associated with the first confidence threshold, determining that a second measurement the confidence values in the third string is beyond the range associated with the second confidence threshold;

comparing the confidence value for each character in the combined string with a corresponding confidence value in the third string;

selecting a character from one of the combined string or the third string with a higher confidence value; and outputting a fourth string including the selected characters and the confidence value associated with each selected character.

10. The method of claim 1, wherein the identifying comprises identifying the first location based on predefined attributes associated with the information to be decoded.

11. The method of claim 1, wherein the first confidence threshold is associated with a percentage of the confidence values associated with a higher certainty of accuracy and the second confidence threshold is associated with a percentage of the confidence values associated with a lower certainty of accuracy.

12. An imaging scanner comprising:

an image capturing component configured to sequentially capturing two or more images of a single document; and a processor configured to:

identify a first location in a first captured image where information to be decoded is located, analyze each character in the first location, and produce a first string including both a corresponding character and a first confidence value for each character in the first location;

determine that a first measurement of the confidence values in the first string is beyond a range associated with a first confidence threshold;

identify a second location in a second captured image where information to be decoded is located, analyze each character in the second location, produce a second string including both a corresponding character and a second confidence value for each character in the second location;

compare the first confidence value for each character in an identified location in the first string with the second confidence value for the character in the same identified location in the second string;

select a character from one of the first string or the second string with a higher confidence value; and produce and output a combined string including the selected characters.

13. The imaging scanner of claim 12, wherein the processor is further configured to, in response to the determining that the first measurement of the confidence values in the first string is beyond the range associated with the first confidence threshold, determine that a second measurement of the confidence values in the first string is beyond a range associated with a second confidence threshold; and wherein the processor is configured to identify a second location in a second captured image where information to be decoded is located after said determining that the second measurement of the confidence values in the first string is beyond the range associated with the second confidence threshold.

14. The imaging scanner of claim 12, wherein the processor is further configured to determine that a first measurement of the confidence values in the second string is beyond the range associated with the first confidence threshold, and responsive to determining that the first measurement of the confidence values in the second string is beyond the range associated with the first confidence threshold, determine that a second measurement of the confidence values in the second string is beyond the range associated with the second confidence threshold; and wherein the processor is configured to compare the confidence value for each character in the first string with a corresponding confidence value in the second string after the processor has performed an operation to determine that a second measurement of the confidence values in the second string is beyond the range associated with the second confidence threshold.

15. The imaging scanner of claim 12, wherein the processor is configured to determine that the confidence value is within in a range, with a lower end of the range indicating a lower level of certainty with respect to the accuracy of a corresponding character in an associated string and a higher end of the range indicating a higher level of certainty with respect to the accuracy of the corresponding character in the associated string.

16. The imaging scanner of claim 12, wherein the processor is configured to determine that the first measurement of the confidence values in the first string is within the range associated with the first confidence threshold, output the first string, and end a decoding process.

17. The imaging scanner of claim 12, wherein the processor is configured to determine that the second measurement of the confidence values in the first string is within the range associated with the second confidence threshold and end a decoding process.

18. The imaging scanner of claim 12, wherein the processor is configured to identify the second location by expanding the first location by a predefined amount.

19. The imaging scanner of claim 12, wherein the processor is configured to determine that a first measurement of the confidence values in the combined string is within the range associated with the first confidence threshold, output the combined string, and end a decoding process.

20. The imaging scanner of claim 12, wherein the processor is configured to determine that a first measurement of the confidence values in the combined string is beyond the range associated with the first confidence threshold, identify a third location in a third captured image where information to be decoded is located, analyze each character in the third location, and produce a third string including a corresponding character and a confidence value for each character in the third location.

\* \* \* \* \*